United States Patent [19]

Tsiakas et al.

[11] Patent Number: 4,646,289
[45] Date of Patent: Feb. 24, 1987

[54] SIGNAL MULTIPLEXING CIRCUIT

[75] Inventors: Nicholas Tsiakas, Kanata; Stephen K. Sunter; Ronald G. Wellard, both of Nepean; Lawrence H. Sasaki, Ottawa, all of Canada

[73] Assignee: Northern Telecom Limited, Montreal, Canada

[21] Appl. No.: 678,883

[22] Filed: Dec. 6, 1984

[30] Foreign Application Priority Data

Jun. 29, 1984 [CA] Canada ................................. 457836

[51] Int. Cl.$^4$ .............................................. H04J 3/12
[52] U.S. Cl. ......................................... 370/76; 379/93
[58] Field of Search ...................... 370/110.1, 85, 124, 370/24, 50, 76, 29; 179/2 DP

[56] References Cited

U.S. PATENT DOCUMENTS 3,701,851 10/1972 Starrett .................................. 370/76
4,090,035  5/1978 Popkin .................................. 370/29
4,171,467 10/1979 Evenchik ............................. 370/50
4,178,480 12/1979 Carbrey ............................ 179/2 DP
4,381,427  4/1983 Cheal et al. ...................... 179/2 DP

OTHER PUBLICATIONS

"Carrier Telephone", MacDowell and Nevitt, 10-1956, all.

Primary Examiner—Douglas W. Olms
Assistant Examiner—Curtis Kuntz
Attorney, Agent, or Firm—Michael M. Sakovich

[57] ABSTRACT

Bidirectional communication of voice and data signals over a two wire telephone line interconnecting several telephone sets with a digital access circuit of a central data and voice communication facility is achieved by a frequency division multiplexing circuit that functions either as a set interface for a telephone or as a line card interface for the access circuit. Data message signals input to the multiplexing circuit are stored in a shift register for subsequent modulation of a carrier signal, but since only one interface may enter a transmission mode at one time transmission priority is assigned by a controller to the interface that first attempts transmission on an inactive line. All other interface then enter a monitor mode to listen but not act on the transmitted message. Transmission errors caused by line noise, or collision transmissions between two or more interfaces are resolved via message transactions between the interfaces only, and retransmission priority is resolved in favor of an interface having the lowest address. Controllable transmit and receive equalizers define analog signal paths in the interfaces and compensate for line losses.

16 Claims, 9 Drawing Figures

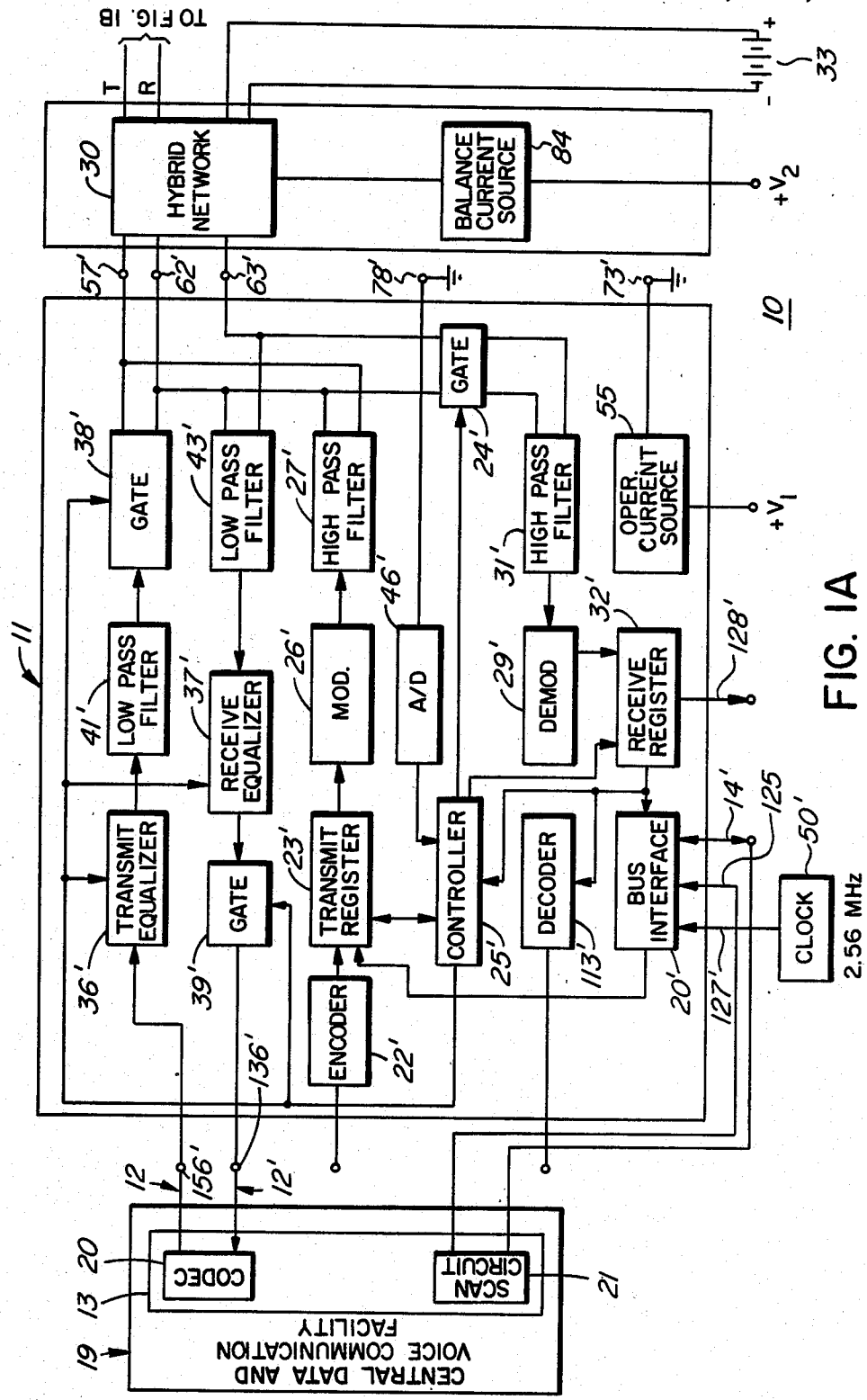

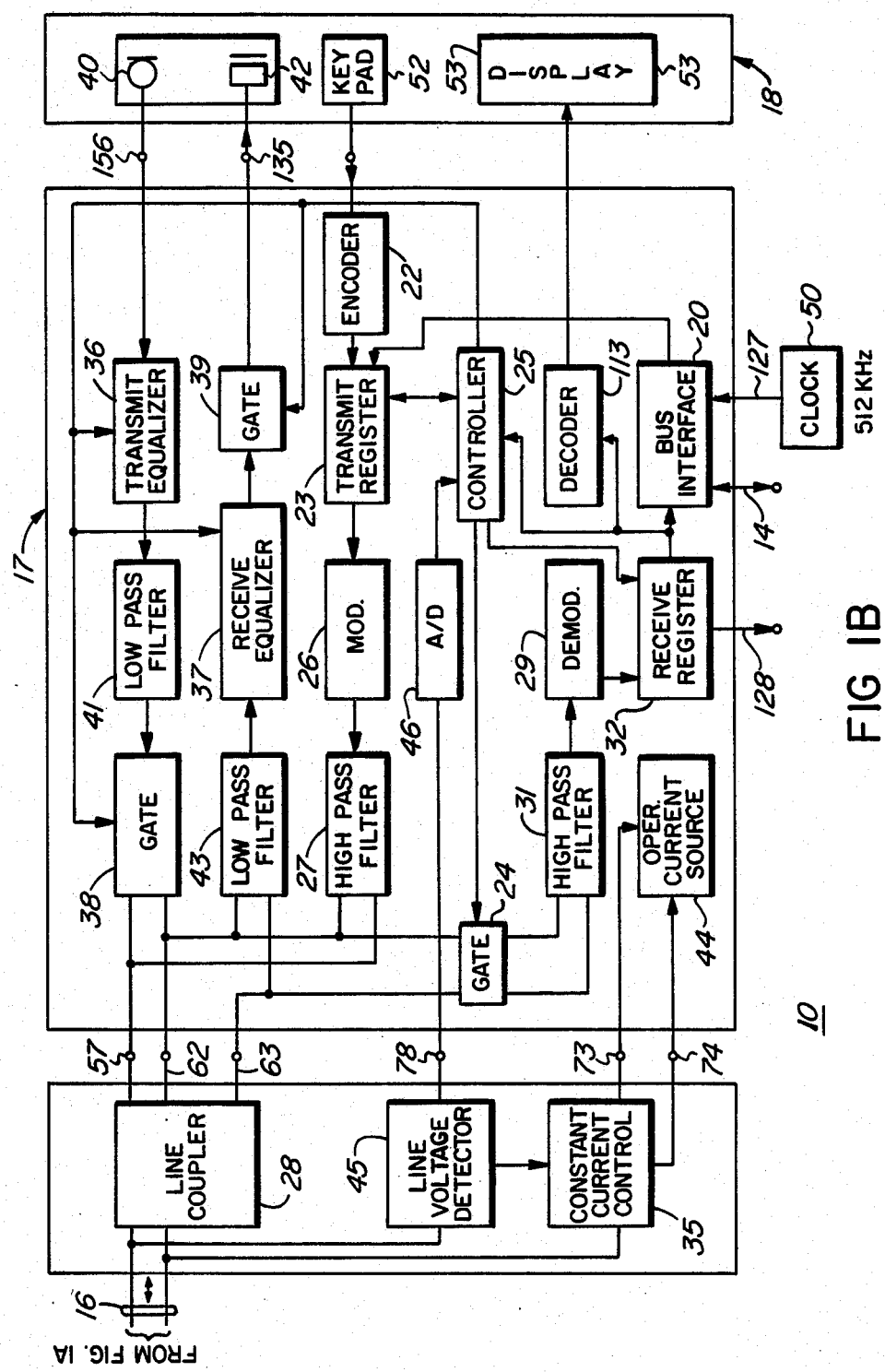
FIG IB

FIG. 2A

FIG. 2B and an inactive line state in the absence thereof. Transmit register means responsive to a data message bit field input thereto store the bits until the occurrence of a predetermined inactive line state. Controller means responsive to the detected inactive line state enable a serial data bit output of the register means, and modulator means having an input coupled to the data output modulate a high band carrier signal and output the signal on the line. Equalizer means that include analog signal receiving and transmitting paths connected between signal inputs thereto and the line, controllably enable and disable the paths in response to predetermined ones of the data message bit fields input to the controller means.

DESCRIPTION OF THE DRAWINGS

The invention will now be more particularly described with reference to embodiments thereof shown, by way of example, in the accompanying drawings in which:

FIGS. 1a and 1b are block diagrams of the invention shown as a line card interface for a digital access circuit of a central data and voice communication facility which is interconnected via a two wire telephone line to a station set interface for an electronic key telephone station set;

FIGS. 2a and 2b are schematic diagrams of line coupling circuits indicated in FIG. 1;

GENERAL DESCRIPTION OF THE ILLUSTRATED EMBODIMENTS

Figure 3:
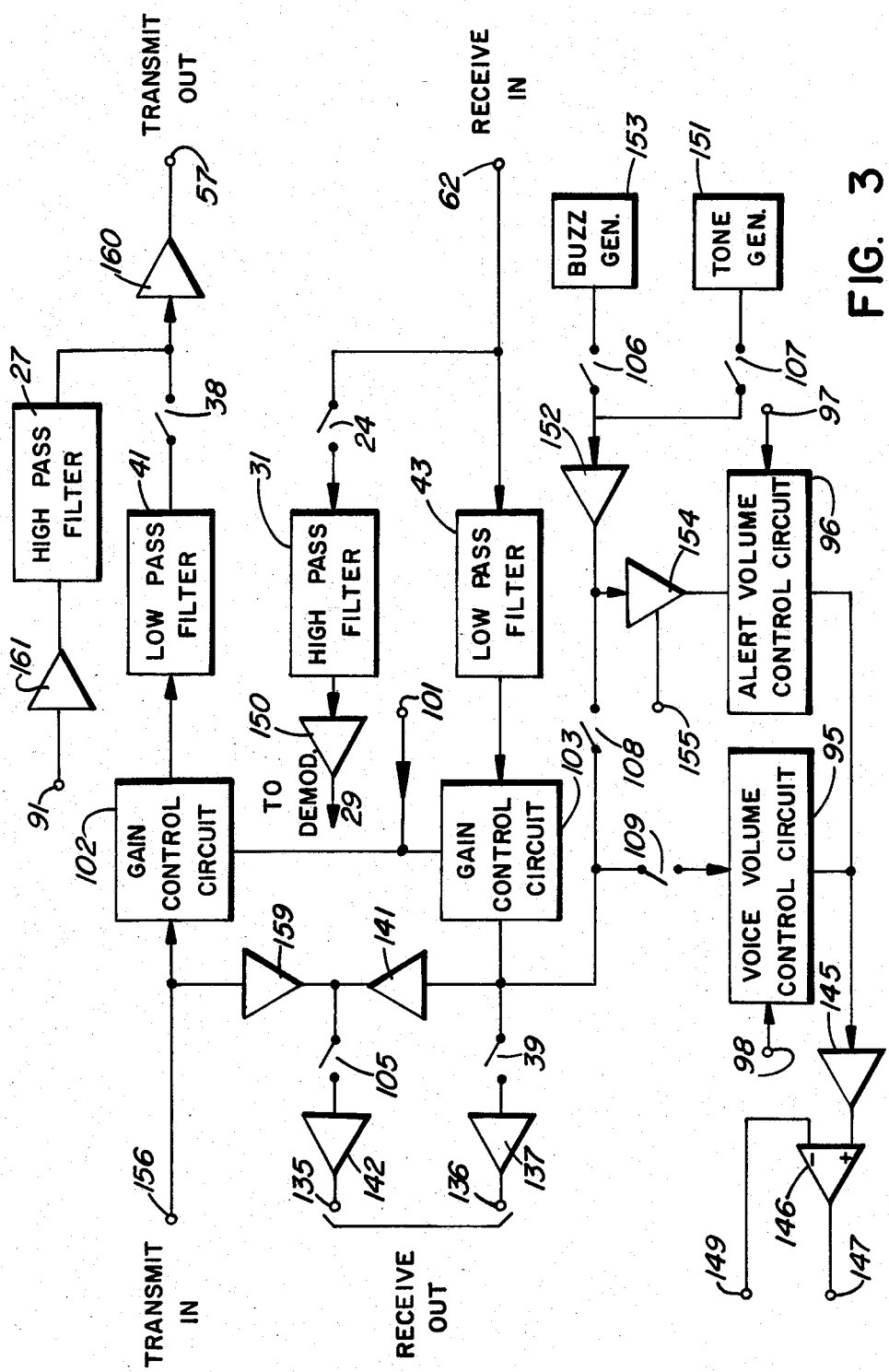
FIG. 3 is a block diagram illustrating controllable analog signal paths in the signal multiplexing circuit of the invention.

A telephone system 10 that embodies a signal multiplexing circuit of the present invention is illustrated in the block diagram of FIG. 1. It will be understood, therefrom, that such circuit is selectively operable as a line card interface 11 having an analog voice signal input 12 and an output 12' connected to a digital access circuit 13. An input/output (I/O) port 14' constitutes a high speed digital signal port that is also connected to the circuit 13. As shown, the circuit 13 forms part of a central data and voice communication facility 19. Typically, this facility may comprise either a local private branch exchange (PBX), a private automatic branch exchange (PABX) or a switching system of a local telephone central office (CO).

The system 10 makes use of a single pair of wires, shown as a two wire telephone line 16 having tip (T) and ring (R) conductors, that are used to connect the interface 11 to a station set interface 17 of a data and voice station shown as an electronic key telephone (EKT) station set 18.

Having regard to the respective diagrams of the interfaces 11 and 17, it will be observed that both circuits are the same, with differences occurring in minor connection changes and in either the addition or deletion of the station set 18. It becomes apparent, therefore, that the signal multiplexing circuit of the invention may be operated either as the interface 11 or interface 17 with minor wiring changes. This arrangement permits bidirectional communication between the interfaces as illustrated or between the interface 11 and addresssable ones of a plurality of station interfaces 17 via the line 16.

Bidirectional communication between the interfaces 11 and 17 provides a convenient method by means of which the interface 17 reports to the interface 11 on user actions. Typical examples are, going OFF HOOK or ON HOOK and pressing keys as when dialing a directory number. In turn, the interface 11 conveys the information to the facility 19 which then determines under software control how the user requests are to be implemented. Instructions from the facility 19 are communicated in the form of a serial bit stream to the I/O port 15. Decoding of analog voice signals occurs via a codec 20 and analog voice signals and digital message signals are conducted through the input 12 and the port 14', respectively, to the interface 11. Thereafter, message transactions between the interfaces occur until a communication path is established between the calling and the called party.

In accordance with the aims of the invention, local intelligence in the interfaces resolves many difficulties as may occur when there is considerable noise on the line 16 or if there are other transactions in progress at the time the facility 19 attempts sending a message to one of the sets 18. Under such circumstances, the facility 19 sends a message once which is received by the interface 11. The interface 11 may then transmit that message a number of times until the noise or conflict problem is resolved and the appropriate called set 18 has been contacted. The facility is thus free of such housekeeping duties and is available to attend to other matters until the message transactions are completed.

The interface 11 and complimentary interfaces 17 of the sets 18 which are on the same line 16 share a standard voice frequency channel with an above-band common signalling channel. This communication path is carried by the tip and ring conductors of the line 16 which comprises a non-loaded outside plant loop that is typical of North American urban and suburban telephone plant.

Signalling and powering arrangements are designed to achieve a range of 4750 meters in most applications. The signalling band, which is centered around 8 KHz, permits the exchange of about 40 messages per second between communicating interfaces via a modulated (interrupted) carrier.

A three bit address code is assigned to individual ones of the interfaces 17. This allows for a maximum of eight terminal devices that include station sets 18 and add-ons such as extensions. The interface 11 has no true address code but is identified by a direction bit, hereinbelow to be described in the message format. The interface 17 for the principal set 18 is, however, given address zero with any other interfaces 17 having addresses in ascending order up to and including the binary number 7. When the interface 17 originates a call, its address is included in the message. Likewise, the address of the interface 17 is included in any message received from the interface 11. The interface 11 passes on instructions received from the facility 19, via a scan circuit 21, to the interface 17 and, in reply, the interface 17 reports to the interface 11 on its actions. In the embodiment described, up to thirty-two interfaces 11 are serviced by one circuit 21.

SIGNAL MULTIPLEXING CIRCUIT

FIELD OF THE INVENTION

This invention relates to a communications system in which analog voice signals, digital message signals and auxiliary digital signals are communicated simultaneously over a common signal path and more particularly to signal multiplexing apparatus that is operable either as a line card interface for a digital access circuit of a central data and voice communications facility or as a station set interface for a data and voice station, and which is controllably operable to provide bidirectional communication of these signals between corresponding pairs of interfaces.

BACKGROUND OF THE INVENTION

Increasingly, user demands on telephone facilities have far exceeded the basic requirement for a clear voice connection between calling and called parties. In particular, the business community, knowing of special business features such call forwarding, conference calling, and speed dialing, have placed heavy demands both on telephone companies and equipment suppliers to provide apparatus and service that will economically satisfy such demands.

Moreoever, it is expected that these business features will be available through a central data and voice communications facility, either as a conventional telephone office switching center or as a privately owned counterpart in the form of a private branch exchange (PBX) or a private automatic branch exchange (PABX).

Previously, additional telephone features of the type indicated generally required the use of additional wires in the form of a cable. Economy suffered as a result in view of higher cable costs in both initial procurement and installation. In this regard, many private telephone systems require a minimum of four wires connecting subscriber sets to the telephone system that serves them. Since the cables of such systems are infrequently used throughout the course of a business day, many companies are reluctant to commit substantial expenditures for such installations, especially since a second pair of wires could be used for other purposes such as data transmission. Moreover, four-wire transmission is incompatible with existing two-wire transmission in the outside plant. Furthermore, power requirements of such multi-wire systems are by no means insubstantial which generally limits the range of a subscriber set in a PBX to within, at most, one thousand metres of the switching center. Accordingly, a company occupying a large building or having staff members in several outlying buildings would likely experience difficulty in obtaining business features at all locations.

A further problem that may be experienced as a result of the one thousand metre limitation relates to a company that may be too small to justify purchasing its own PBX and is either unwilling or unable to share jointly in ownership of a PBX with other small companies in the same building. Thus, a small company is disadvantaged in terms of its ability to obtain business services.

Recognition of these problems has resulted in the development of apparatus and systems that are especially adapted to share a common signalling path for voice signals and digital message signals together with auxiliary digital signals. Two typical prior art patents describing the use of a single pair of wires carrying a plurality of signals as noted may be seen in U.S. Pat. No. 4,171,467 issued Oct. 16, 1979 to L. N. Evenchik and U.S. Pat. No. 4,178,480 issued Dec. 11, 1979 to R. L. Carbrey. Both patents relate to signal multiplexing and disclose a signal multiplexing circuit that makes use of a single pair of wires to interface a data and voice communication circuit such as an electronic telephone (EKT) station set with a central data and voice communication system such as a business communication system (BCS).

To the extent indicated in the Evenchik and Carbrey patents, the problems associated with providing a telephone system having business features are substantially overcome. One problem remains outstanding, however, and is not fully addressed by either Evenchik or Carbrey.

This is the relatively inefficient use of a central data and voice communication facility to reduce user problems as, typically, when noise on the line creates a transmission error and, perhaps more commonly, when requiring the facility to resolve caller priorities should two EKT station sets attempt transmission at the same time. Under these circumstances some portion of the facility is occupied for a discrete interval and, in terms of total numbers of such occurrences over an extended period of time, an effective reduction of facility capacity results.

SUMMARY OF THE INVENTION

One provision of the present invention is a signal multiplexing circuit that is economically producable in larger production runs in view of its operable capability as both a line card interface for a digital access circuit of a central data and voice communication facility as well as a station set interface for a data and voice station.

Another provision of the invention is a signal multiplexing circuit that is capable of bidirectional communication between the line card interface and addressable ones of the station interfaces.

Still another provision of the invention is a signal multiplexing circuit having an idle mode of operation during which operating current requirements are minimal.

Yet another provision of the invention is a signal multiplexing circuit that is capable of resolving call priority conflicts.

Another provision of the invention is a signal multiplexing circuit having an automatic gain control (agc) to compensate for resistive voice signal losses on long lines.

Yet another provision of the invention includes a system for digitally controlling ringer and voice signal volumes in a station set interface.

Another provision of the invention includes a digital display to indicate the status of the telephone set.

The problems associated with the prior art may be substantially overcome and the foregoing provisions achieved by recourse to the invention which is a signal multiplexing circuit selectively operable as a line card interface for a digital access circuit of a central data and voice communication facility and as a station set interface for a data and voice station, and which is controllably operable for bidirectional communication between the line card interface and addressable ones of a plurality of station interfaces interconnected via a two wire telephone line. The circuit comprises line sampling means responsive to a carrier signal for detecting an active line state in the presence of the signal on the line Communication between calling and called interfaces is asynchronous with each interface having access to the line 16. System protocol requires, however, that when a calling interface is transmitting a signal, all other interfaces enter a monitor mode in which the transmission is received but not acted upon. A called interface will therefore enter the monitor mode, which may also be referred to as a receive mode, from an idle mode whenever it detects a valid start of message bit on the line 16. It is apparent, therefore, that an interface may be in any one of three modes; idle, receive (monitor), or transmit.

In the idle mode, the line 16 is inactive which means that a carrier signal for the signalling band is not present on the line. According to the protocol of the present system, carrier on the line represents a logical one whereas absence of a carrier signifies a logic zero level. Thus, the line will be active for both transmit and receive modes since a calling interface will output a modulated carrier in the course of transmitting a bit field as a corresponding stream of data message pulses.

Prior to transmission, also referred to herein as initiating a call, the calling interface firstly determines the status of the line. Assuming that no other transmissions are present, the line status is inactive, logical zero, which permits the calling interface to initiate transmission.

Notwithstanding the foregoing requirement to establish call priority, occasionally two interfaces will enter the transmit mode almost simultaneously. The resulting simultaneous transmissions are referred to as a collision. This results in an invalid transmission which all monitoring interfaces will ignore and await a retransmission which occurs only once since transmission priority is immediately established.

In order to minimize the likelihood of subsequent collisions, transmit priority for the interfaces on the line 16 is established in ascending order of interface addresses. Thus, first priority is given to the interface 11 which has no address. Priority is next assigned to the interface 17 having zero as its address. Least priority is thus assigned to the interface 17 having the binary address 7. With priority thus established, the calling interface will firstly monitor the line 16 to establish that it is inactive and then follow with a first retransmission. By this time, the interface with junior priority would check the line status and, finding it active, would enter the receive mode.

Once transmission begins, all other interfaces on the line would similarly detect the state thereof and, finding it active, would also enter the receive mode to monitor the transmission passively. The interface identified in an address field of the transmission will acknowledge the transmission upon successful receipt thereof, thereby establishing a bidirectional communication path between the calling and called interfaces. Subsequently, when a main computer, not shown, of the facility 19 polls the interface 11, message data stored therein is output through the port 14' with the computer being unaware of the collision resolution. More importantly, however, no real time of the facility is required to resolve the collision.

Errors in transmission are of two types. Firstly, there are collisions as described hereinabove. Secondly, there may be a parity error. According to the established protocol of the present system, correct parity is present when the total number of logical one bits in the message, including the start bit, is odd. Thus, should parity be even, degradation of the message has likely occurred thereby rendering it invalid. As in collision errors, parity errors will result in only one retransmission in an attempt to recover from the invalid message. Thereafter, additional attempts, if required, would be treated like new transmissions requiring initiation by a telephone subscriber.

A typical calling sequence may be followed with reference to FIG. 1. When the set 18 goes OFF HOOK, the line status is firstly checked by a control circuit, shown as a controller 25. Assuming that the line is inactive, an encoded data signal representing the OFF HOOK condition is generated by an encoder 22 and is applied to a transmit shift register 23. A serial bit output from the register 23 is routed to the controller 25 which enables a modulator 26 that generates a modulated 8 KHz carrier signal. The signal is then passed through a high pass filter 27 to a drive input of a line coupler 28. The output of the coupler 28 is connected across the line 16. Subsequently, the interface 17 continues to monitor line status during transmission of its data message, hereinbelow to be described. This occurs by sampling the line on all zero bits in a direction, address, transaction code and repeat field portions of the transmitted data message. Sampling occurs via an input gate 24, coupled through a high pass filter 31 to a demodulator 29 to check for the presence of the carrier signal. If the interface 17 is the only one transmitting, the line status will be zero on each check. The complete data message will then be sent with its error bits set to repeat low and collision high, the latter indicating no collision. The interface 17 then awaits confirmation that the called interface 11 has received a valid message.

Following application of the data message to the line 16 in the form of the modulated carrier signal, the signal is coupled through a hybrid network 30 to the interface 11. The signal is then routed via a gate 24' and a high pass filter 31' to a receive demodulator 29' which detects the data message bit stream and applies same to a receive register 32'. A serial data bit output therefrom is connected to a control circuit, shown as a controller 25', where the validity of the data message is tested. When found valid, a control signal is output therefrom to a modulator 26' from which a confirming signal acknowledging receipt of the valid message is sent out on the line 16 to the calling interface 17.

This confirming signal is referred to herein as a positive acknowledgement (PACK) which is coupled through a signal input portion of the line coupler 28 to the demodulator 29 via the gate 24 and the high pass filter 31. The detected PACK signal is subsequently input to a receive register 32 and therefrom to the controller 25 which sets the interface 17 in an active mode with all functions operational. Thus, the interface 17 becomes fully active upon reception of a collision free message with correct parity and matching address. At this point in the operating sequence a constant current control circuit, shown as a current sink 35, is enabled together with controllable transmit and receive equalizers 36 and 37, respectively, along with their corresponding control gates 38 and 39.

Reference to FIG. 1 shows a telephone transmitter 40 of the set 18 connected to a controllable transmitting voice analog signal path in the interface which comprises a serial combination of the equalizer 36 followed by a low pass filter 41 and the gate 38 to the drive input of the coupler 28.

A corresponding receiver 42 of the set 18 is shown connected to a receiving voice analog signal path of the interface 17 which comprises a serial combination of the gate 39, the equalizer 37 and a low pass filter 43 which has an input connected to a receive output of the line coupler 28.

Turning on the current sink 35 provides a constant current input to the interface 17 at an operating current source 44.

Associated with the current sink 35 is a line voltage detector 45 which produces a dc control voltage that is inversely proportional to the length of the line 16. This control voltage is applied to an analog/digital (A/D) converter 46 which functions through the controller 25 to control the respective gains of the equalizers 36 and 37. Concurrently, gates 38 and 39 are enabled by the controller 25 to complete the analog signal paths between the set 18 and the line 16.

A bus interface 20, corresponding to a bus interface 20' of the interface 11, is available for optional use as a high speed data port that is stepped by a clock 50 at 512 KHz. In the calling mode described for the interface 17, however, data signals would likely be generated by a user controlled peripheral apparatus. A liquid crystal display (LCD) 53 has an input connected to the output of a data decoder 113, driven by the register 32, and provides a visual readout of a function selected at a key pad 52 or the functional status of the interface 17.

Turning next to the interface 11, a circuit similarity with the interface 17 is apparent with minor differences occurring only in circuit connections. Also, the bus interface 20' is similarly stepped by a clock 50', but at 2.56 MHz in order to operate its high speed port 14'. Whereas in the interface 17 the bus interface 20 is available to provide an optional high speed data port, the corresponding bus interface 20' provides the high speed data port 14' for continuous communication with the facility 19.

Some of the circuits employed in the interface 17 are redundant in the interface 11 and are so indicated. For example, an A/D converter 46' is shown with its input grounded, thereby rendering it disabled together with a corresponding portion of the controller 25'. It will be apparent, therefore, that the interface 11 includes transmitter and receiver equalizers 36' and 37', respectively, which have a fixed gain of 0 dB. Thus, it will be understood that the output from the equalizer 36' coupled through a low pass filter 41' to an input of a gate 38', is applied to an input of the network 30 with no gain control thereof.

In a similar fashion, a voice analog signal input from the line 16 to a low pass filter 43' is amplified at a fixed gain by the equalizer 37'.

Data message signals input to the bus interface 20' are output therefrom via the transmit shift register 23' to the controller 25' for testing. The signals are then coupled to the modulator 26' for generating the 8 KHz carrier signal which is applied through a high pass filter 27' to an input of the network 30.

Unlike the interface 17 which operates from the current sink 35 that obtains its voltage from a battery 33 applied across the tip and ring conductors via the network 30, the interface 11 operates from a conventional operating current source 55.

MESSAGE FORMAT

Figure 5:
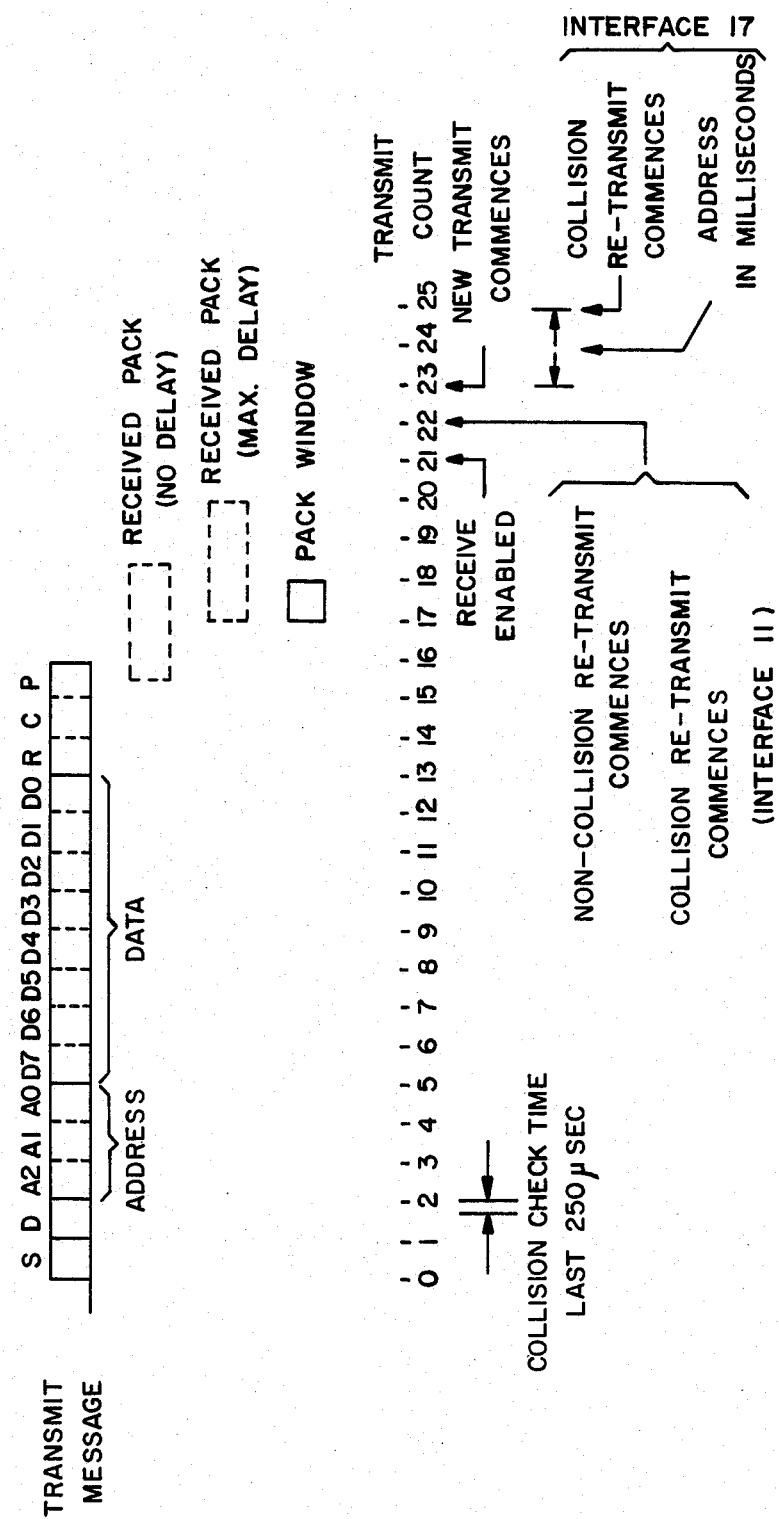
FIG. 5 is a diagram of a transmit sequence of data message pulses.

The transmitted message, referred to hereinabove, is shown in FIG. 5 as comprising 16 data bits with each bit length being 1 ms in duration. The message comprises the following:

BIT DESCRIPTION

S—start bit
D—message direction bit
A2, A1, A0—three-bit address field
D7, D6, D5, D4, D3, D2, D1, D0—eight-bit transaction code
R—repeat error-detection bit
C—collision bit
P—parity bit The start bit S is a logic one, the idle state of the line being zone or the absence of the 8 KHz carrier. The direction bit D is zero for transactions originating at the set 18 and one for transactions originating at the interface 11. The bit D ensures that collisions are always detected where the interface 11 message address field matches the address of a called interface 17.

Reducing the effects of line noise and collision occurs by way of the bits R, C, and P. Thus, the bit R is brought high on retransmissions not occurring as a result of collisions. This normally low bit works in conjunction with an internal flag of the controller 25 to judge whether a receive message that is free from errors is to be accepted. When an interface receives a message with incorrect parity, it sets the flag. If parity is correct the flag is reset. The timing of retransmissions is such that a retransmission should follow immediately after a message with a parity error. The action of the flag and the bit R is summarized as follows:

(a) The flag and bit R are both set—message is accepted (retransmission assumed).
(b) The flag is set and the bit R is reset—message is accepted (new message assumed).
(c) The flag is reset and the bit R is set—message is ignored (it is assumed that the retransmitting set failed to detect a PACK for a correct message).
(d) The flag and bit R are both reset—message is accepted (new message assumed).

The flag and bit R are not set for the reception of collided messages and collision retransmissions, respectively.

In the transmission protocol of the present invention, if two interfaces are transmitting and one transmits a one while the other transmits a zero, an interface monitoring the line will detect the high level. Using this property, it is possible for a transmitting interface to detect other interfaces on the line 16. Each time an interface transmits a zero, it monitors the line to ensure that the line has the correct level. If there is a difference between the actual and expected line levels, a collision has occurred. The line is sampled following a zero bit transmission after a wait period in excess of the modem delay, but before the next bit is transmitted. Collision checks are performed on all zero bits in the direction, address, transaction code and repeat fields. When a collision is detected, the normally high bit C is brought low. A message with a low bit C is ignored and no positive acknowledgement is sent. The flag is set if there is also a parity error.

When a calling interface detects a collision, it undertakes retransmitting the message with the bit R low, after the current transmission is finished. Collision associated retransmissions occur after a wait period that is proportional to the calling interface address. Since each set interface 17 has a unique address, collisions will not occur again on retransmission. As previously mentioned, the interface 11 is given first priority on collision recovery attempts. This provision should result in only one retransmission before the collision is resolved.

The bit C is normally high for two reasons:
(a) glitches triggering start bit detection will not be recognized as valid massages; and
(b) if the bit C was high during collision, phasing effects from the colliding transmissions could cause corruption of the bit.

A determination of bit corruption is provided by the parity bit P which is calculated such that the total number of ones in the message including the start bit is odd. The called interface checks the bit P and compares the line value with its calculated parity value. If there is a match and the bit C is high, the message is considered valid and a positive acknowledgement is transmitted by way of the PACK signal. A calling interface not receiving the PACK signal and not detecting a collision assumes a parity error and retransmits the message with the bit R set. The calling interface begins retransmissions before other interfaces can initiate any new transmissions and only a single retransmission attempt is made.

TIMING CONSIDERATIONS

Each bit length is nominally 1 ms in duration and the bit S must exceed 500 $\mu$s to be valid. Thus, when a valid bit S is detected by a called interface, the interface will enter the receive mode and the remaining bits in the message will be sampled in the second half of each bit.

A calling interface looks for a PACK signal on the line 16 between 17 and 18 ms into the transmit sequence. The PACK signal must be present for 500 $\mu$s to be considered valid.

FIG. 5 illustrates the transmit sequence and reference thereto will show that when a decision is made to retransmit because of a non-collision error, the retransmit sequence begins 22 ms into the transmit sequence. Retransmission, because of collisions, commences 23 ms plus the set address (3 ms) into the message transmission for interface 17 and 22 ms for the interface 11. Transmission of new data is enabled at count 23 ms. In all cases, the interface 11 and 17 receive portions are enabled at transmit count 21. If a valid start bit is detected before an interface begins retransmission or a new transmission, the receive mode will be entered and the transmit message will be stored in the register 23 for transmission at a later time.

Figure 6:
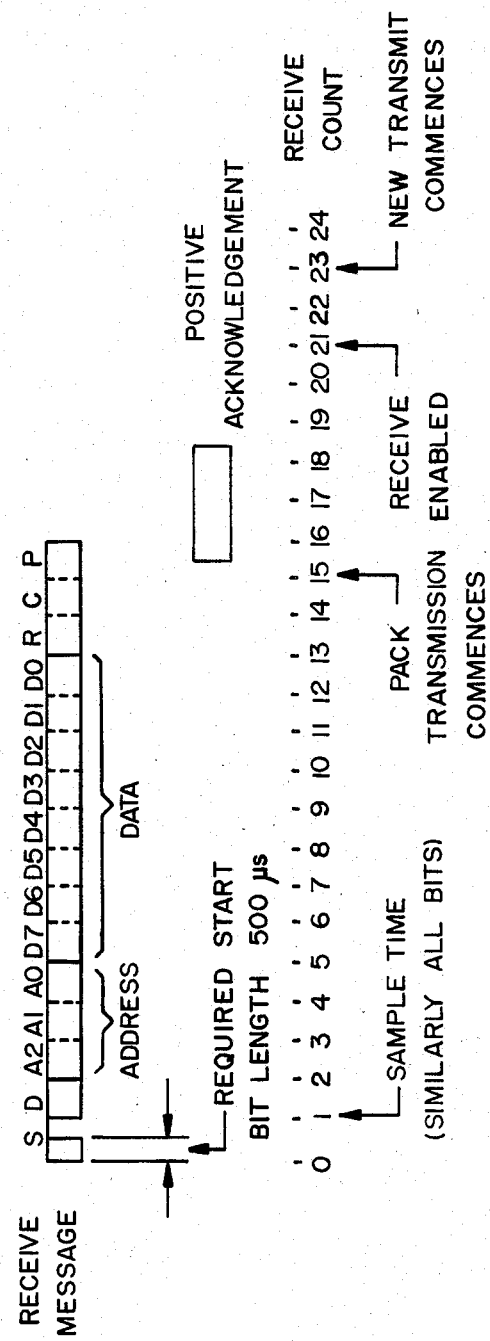
FIG. 6 is a diagram of a receive sequence of data message pulses.

The receive sequence of data bits is illustrated in FIG. 6. Reference thereto shows that in the receive mode, positive acknowledgement to the calling interface commences at receive count 15. The PACK signal will be removed from the line 16 at 18 ms into the receive sequence and a new receive operation is enabled at receive count 21. Transmission of new data may commence 23 ms into the receive sequence. As with the transmit signals, the transmission of new data is delayed to give retransmissions priority. It will also be observed that the receive count is referenced to a valid start bit detection time and is therefore delayed about 500 $\mu$s with respect to the transmit count in FIG. 5.

TRANSACTION CODES

In accordance with the best mode of operation contemplated for the present invention, there are two categories of transaction codes which occupy the incoming and outgoing message spaces. Various transaction code definitions are shown in Tables A and B for these two categories and cover transactions between the interfaces 11 and 17. Two additional categories of transaction codes that are used between the interface 11 and the facility 19 are shown in Table C.

TABLE A

| | | | | | | | | Incoming Message Space |
|---|---|---|---|---|---|---|---|---|
| | | | CODE | | | | | |
| M7 | M6 | M5 | M4 | M3 | M2 | M1 | M0 | FUNCTION |
| 0 | 0 | 0 | 0 | 0 | D | D | D | LCD indicator DDD off |
| 0 | 0 | 1 | 0 | 0 | D | D | D | LCD indicator DDD state A (Output 116) |
| 0 | 1 | 0 | 0 | 0 | D | D | D | LCD indicator DDD state B (Output 118) |
| 0 | 1 | 1 | 0 | 0 | D | D | D | LCD indicator DDD on |
| 0 | 0 | X | 0 | 1 | 0 | 0 | 0 | Soft Reset (maintain equalization) (SRS) |
| 0 | 1 | 1 | 0 | 1 | 0 | 0 | 0 | Hard Reset (HRS) |
| 0 | 1 | 0 | 0 | 1 | 0 | 0 | 0 | Save Indicator States (SIS) |
| 0 | X | 0 | 1 | 0 | 1 | 1 | 0 | Open Echo Mode |
| 0 | X | 0 | 0 | 1 | 0 | 0 | 1 | Close Echo Mode |
| 0 | X | 1 | 0 | 1 | 0 | 1 | 0 | Turn on TONE (Gate 107) |
| 0 | X | 0 | 0 | 1 | 0 | 1 | 0 | Turn off TONE (Gate 107) |
| 0 | X | 0 | 0 | 1 | 0 | 1 | 1 | No Function |
| 0 | X | 1 | 0 | 1 | 0 | 1 | 1 | No Function |
| 0 | X | 0 | 0 | 1 | 1 | 0 | 0 | Turn off Tip/Ring to speaker (Gate 109) |
| 0 | X | 1 | 0 | 1 | 1 | 0 | 0 | Turn on Tip/Ring to speaker (Gate 109) |
| 0 | X | 0 | 0 | 1 | 1 | 0 | 1 | Turn off handset (Gates 38, 39, 105) |
| 0 | X | 1 | 0 | 1 | 1 | 0 | 1 | Turn on handset (Gates 38, 39, 105) |
| 0 | X | 0 | 0 | 1 | 1 | 1 | 0 | Turn off BUZZ (Gate 106) |
| 0 | X | 0 | 1 | 1 | 1 | 1 | 0 | Turn on BUZZ (Gate 106) |
| 0 | X | 0 | 0 | 1 | 1 | 1 | 1 | Turn off RING (Gate 108) |
| 0 | X | 1 | 0 | 1 | 1 | 1 | 1 | Turn on RING (Gate 108) |

TABLE B

| | | | | | | | | Outgoing Message Space |
|---|---|---|---|---|---|---|---|---|
| | | | CODE | | | | | |
| M7 | M6 | M5 | M4 | M3 | M2 | M1 | M0 | FUNCTION |
| 0 | 0 | 0 | 0 | 0 | F | F | F | Function key FFF depressed |
| 0 | 0 | 0 | R | R | R | C | C | Key at crosspoint column CC and row RRR depressed |
| 0 | 0 | 0 | 1 | 1 | 1 | 0 | 1 | Set goes ON HOOK |

TABLE B-continued

| | | | CODE | | | | | Outgoing Message Space |
|---|---|---|---|---|---|---|---|---|
| M7 | M6 | M5 | M4 | M3 | M2 | M1 | M0 | FUNCTION |
| 0 | 0 | 0 | 1 | 1 | 1 | 0 | 0 | Set goes OFF HOOK |

DETAILED DESCRIPTION—FIGS. 2-4

The embodiments of the invention hereinbelow described rely, in most instances, on block diagrams to describe various circuit elements and their respective functions. These block diagrams represent individual circuits that would be known to those skilled in the art to whom this specification is addressed, although not in the novel combinations disclosed. Accordingly, the following constitutes a sufficient description to such individuals for a comprehensive understanding of the best mode contemplated to give effect to the embodiments as disclosed and claimed herein.

Figures 2A, 2B:
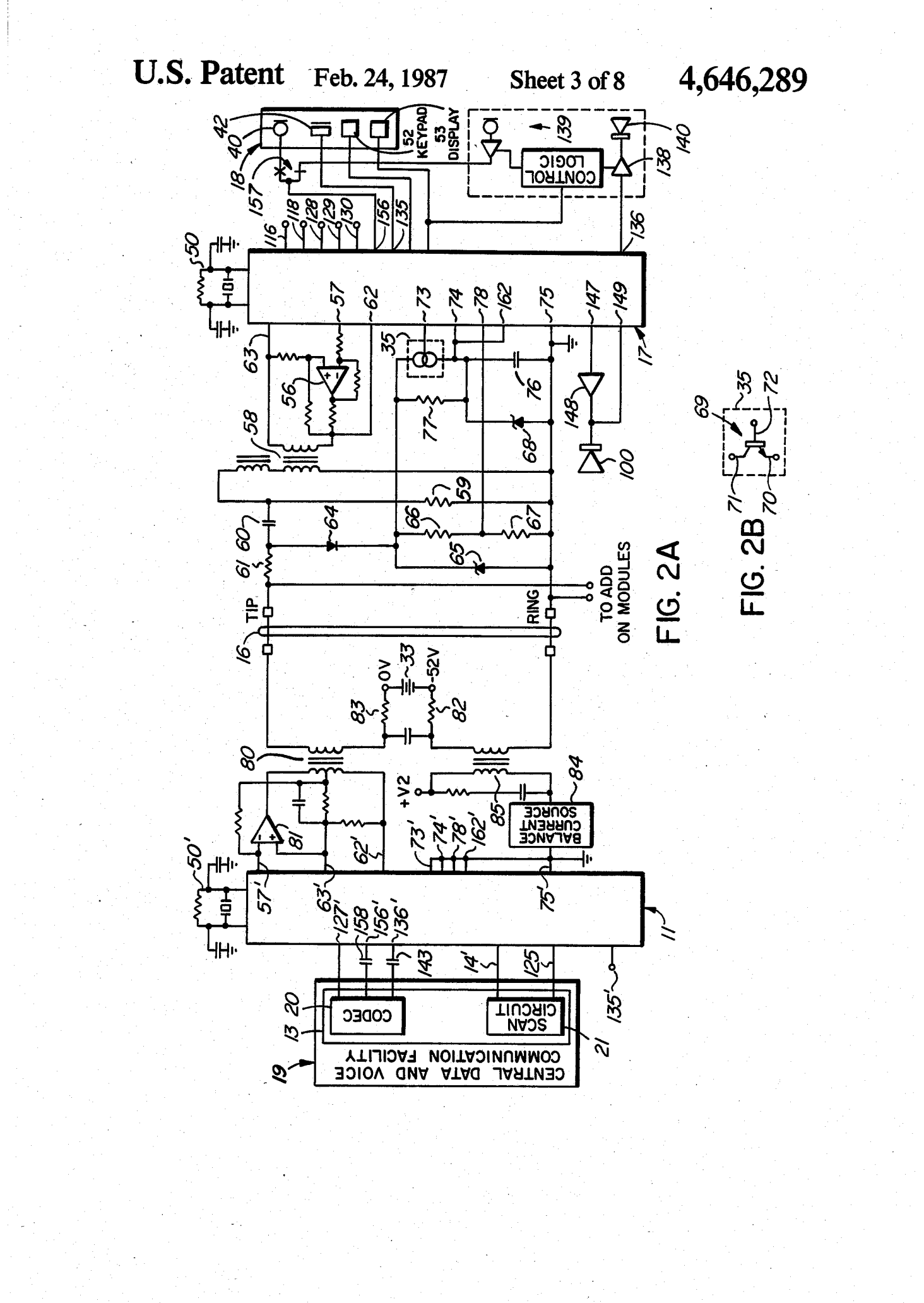

The general description of the present invention disclosed in respect of the block diagram of FIG. 1 is described in more detail in FIG. 2, notably in identifying the various input and output terminals and the manner of the various connections for the interfaces 11 and 17. Moreover, a detailed circuit description is presented herein for the line coupler 28, the line voltage detector 45, the constant current sink 35 and the network 30.

Referring now to FIG. 2, where like numerical designations are used for the same circuit elements illustrated in FIG. 1, it will be understood that the interfaces 11 and 17 are fabricated as CMOS integrated circuits having the same external terminal connections. Even though the circuits of the interfaces are the same, the various interconnections of the terminals and the different devices attached thereto render the interfaces 11 and 17 as distinguishable entities.

Considering firstly the interface 17, it will be observed that the line coupler 28 includes a voltage/current converter which is shown as a line driver 56 having a first input connected to a signal voltage output terminal 57 and a second input connected to a ground terminal 63. The output of the driver 56 is connected across a primary winding of a voice band coupling transformer 58, the secondary winding of which is bridged by a line terminating resistor 59 and which is coupled through a capacitor 60 and a pair of series resistors 61 and 61' to the tip and ring conductors of the line 16. The function of the driver 56 is to impose on the line 16 current signals that are proportional to the voice analog signals originating at the transmitter 40. In the embodiment described, this proportion is in the ratio of 1 ma. out:1 volt in.

It will be understood that only one resistor 59 is used for all of the interfaces 17 sharing the same line 16. In this way, the line remains correctly terminated irrespective of the numbers of interfaces connected thereacross and signal levels are unaffected since the ouptut impedance of each driver 56 is sufficiently high so as to not significantly load down the line 16.

When receiving multiplexed signals on the line 16, such signals are applied through the resistors 61 and 61' and capacitor 60 and are coupled through the transformer 58 to the terminals 62 and 63.

Operating current for the interface 17 is derived from the battery 33 which typically would be located at the facility 19. Accordingly, an operating voltage for the interface 17 diminishes as a result of resistive losses over long lines 16. Multiplexed signalling and voice signals suffer similar losses. In order to ensure stable operation of the circuits in the interface 17, the current sink 35 provides a stable source of operating current. A polarizing diode 64 ensures the correct polarity of voltage applied to the current sink 35. Connected serially with the diode 64 and the resistor 61 across the tip and ring conductors, a Zener diode 65 establishes a maximum limit for dc voltage appearing across a voltage divider comprising resistors 66 and 60 connected in series.

The dc voltage developed across the voltage divider is applied across a serial combination of a Zener diode 68 and the current sink 35. Although it is shown symbolically to represent a constant current generator, the current sink 35 may comprise, typically, an NPN transistor 69 with its emitter 70 connected to the diode 68 and its collector 71 connected to the junction of the diodes 64 and 65. Its base 72 is connected to several resistors and a diode (not shown) in a known manner and to a line current control terminal 73 which provides the base drive for the transistor 69. A power supply terminal 74 is connected to the emitter of the transistor 69 which functions as the drain voltage supply that is nominally +10 volts with respect to a ground return terminal 75. The diode 68 maintains a substantially constant drain voltage and a capacitor 76, connected between the terminals 74 and 75 functions as a filter. Connected across the current sink 35, a resistor 77 ensures a minimum current flow irrespective of current flow through the current sink 35. And, an input terminal 78 is connected to the junction of the resistors 66 and 67 which provides a voltage that is proportional to the voltage across the tip and ring conductors. This voltage is applied to the converter 46 which, in turn, is used to control the voice signal path equalizers 36 and 37, hereinbelow described in greater detail.

Line signals connected to the terminals 62' and 63' of the interface 11 are coupled thereto, typically, through a hybrid transformer 80 which is of known construction. Line driving signals, which appear across the terminals 57' and 63' are amplified by a line driver 81 and are applied across the tip and ring conductors by way of the transformer 80 as shown.

The battery 33 is connected across the line 16 through a pair of current limiting resistors 82 and 83 connected in series with respective halves of one winding of the transformer as shown.

Core saturation in the transformer 80 is avoided by means of a balance current circuit 84 which is shown connected serially with a balance winding 85 in the transformer 80 between a ground terminal 75' and a source of operating voltage. The circuit 84 is of a known type that conducts a balancing current through the winding 85 to reduce dc flux in the core of the transformer 80. A typical balance current circuit is described in U.S. Pat. No. 4,232,293 issued Nov. 4, 1980 to H. H. Harris.

Figure 4:
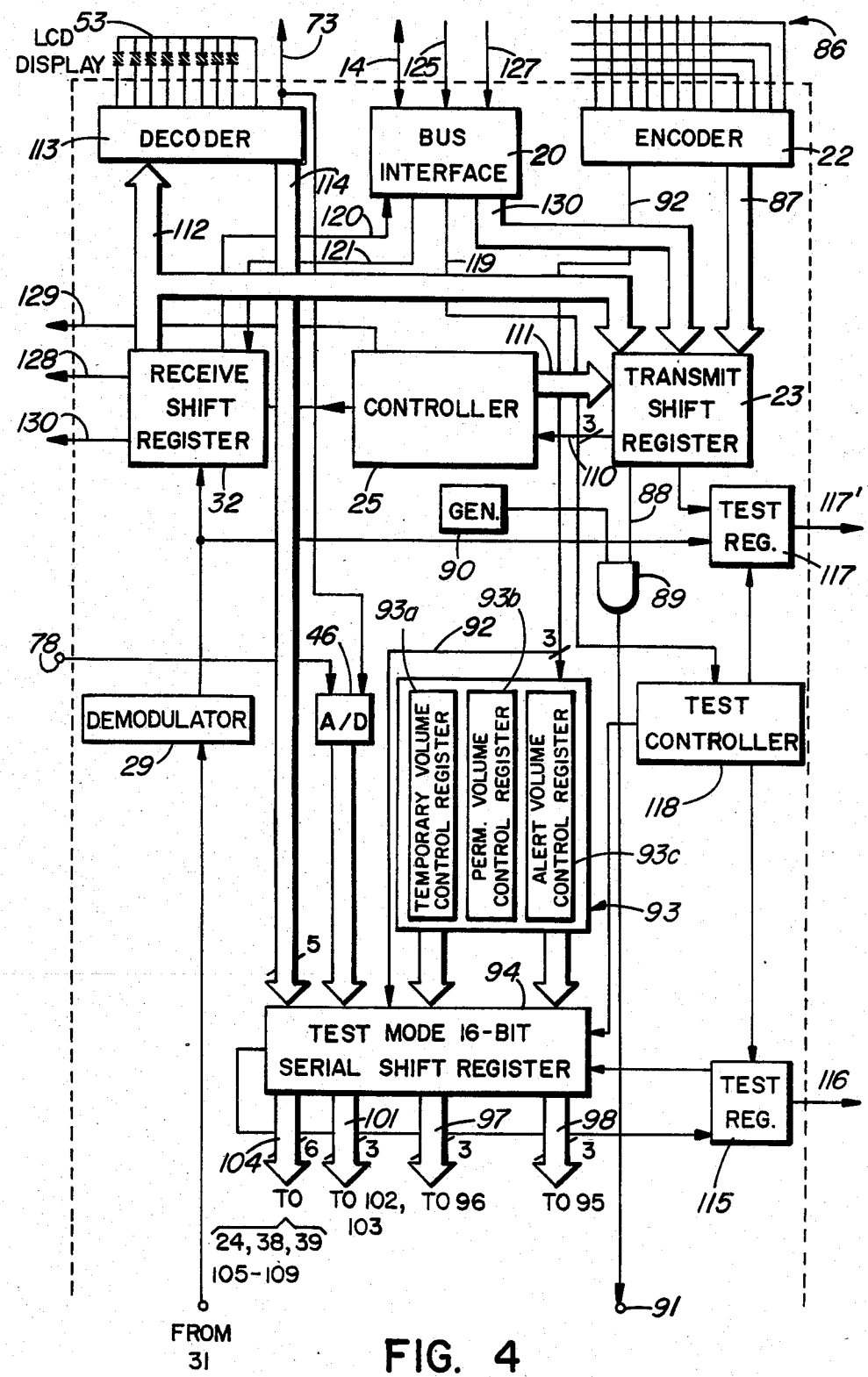
FIG. 4 is a block diagram illustrating controllable digital signal paths in the signal multiplexing circuit of the present invention.

Control functions and digital signalling paths are illustrated diagramatically in a block diagram of FIG. 4. Schematically shown therein is a switching matrix 86 of the key pad 52 by means of which the various outgoing messages illustrated in Table B are generated by the encoder 22.

Thirty-two key crosspoints are illustrated. Three crosspoints are used for the set address and may be encoded in a known manner by connecting a SPST switch (not shown) across each crosspoint. One crosspoint is used for a hookswitch 157 (FIG. 2a) and the remaining crosspoints comprise twelve dial pad keys and sixteen other keys which are assigned as required. In this regard, it will be understood that the incoming messages of Table A are under software control in the computer of the facility 19. As such, the interfaces 17 are conducive of specially designed business features which are implemented by similar software control. Of the sixteen keys, two will be used for volume control in the interface 17, hereinbelow to be described.

Each crosspoint in the matrix 86 is scanned once every 500 μs by a scanning circuit that forms part of the encoder 22. This means that the thirty-two crosspoints of the matrix 86 are scanned once every 16 ms. A key depression is debounced by the encoder 22 if two consecutive scans indicated depression. Key releases are not debounced with the exception of the hook switch contact. A message is sent only once on key depression and an OFF HOOK message is sent once upon debouncing the depression of the hookswitch cross-point. The key pad encoder will also implement a two key roll over feature. Multiple depressions and null scans are both considered as valid scan delimiters. At least one valid delimiter must be found between each valid key depression. No messages are sent for address or volume up/down crosspoints and do not appear in Table B.

When one of the sets 18 goes OFF HOOK, an encoded message, shown in Table B, is output in parallel from the encoder 22 along a key data bus 87 to the register 23. It will be observed that an output lead 88 from the register 23 is connected to one input of an AND gate 89. A second input thereto comprises an 8 KHz signal from a square wave generator 90. Thus, a corresponding stream of serial key data bits developed in the register 23, produces the modulated carrier output at a terminal 91. Concurrently, the status of the HOOK switch is conducted along a lead 92 to inputs of a volume control register 93 and a 16-bit serial shift register 94.

Signal levels for voice and ringing signals, the latter also being referred to herein as an alert signal, necessary for the proper functioning of the set 18, are controllably set by the register 93. Reference to FIG. 4 shows that the register 93 comprises three separate registers 93a, 93b, and 93c, each three bits long, in which the difference between successive binary codes represents a 4 dB change in level. Upon power up, voice volume registers 93a and 93b are each set to their minimum setting and an alert volume register 93c is set to mid-range, i.e., 100 where 111 is maximum volume. The contents of the register 93b may then be modified using the up and down volume control keys of the key pad 52. This controls a voice volume control circuit 95 which adjusts the sound volume at speaker 100. After receiving any "alerting on" message, the alert volume register 93c controls the speaker level via its volume control circuit 96. The "alerting on" messages are shown in Table A and comprise, "Turn on TONE", "Turn on BUZZ" and "Turn on RING". The alert volume register 93C is modified by depressions of the up and down volume control keys, with each depression changing the active location by one setting either up or down for the up and down, respectively. Signalling bus inputs to the control circuits 95 and 96 are an alert volume control bus 97 and a voice volume control bus 98, each of which are parallel three-bit output buses from the register 94 (FIG. 4).

It will be understood that when the speaker 100 (FIG. 2) is not used, pressing a volume control key has no effect. It is only when the speaker 100 is in use that the volume control circuit functions, and the circuit is dependent on whether the speaker is being used for announcing an alert tone or for voice communication. Accordingly, there are two volume settings, one for each. The application of the speaker 100 therefore determines which volume control is incremented or decremented.

Two keys are pressed when it is required to store a setting permanently into the register 93a. Normally, pressing the volume up or volume down keys controls the register 93b while the set 18 is in use. This volume setting is only stored temporarily, however, and is cancelled when going ON HOOK. Conversely, a volume control setting stored in the register 93a is retained, although it may be user set to either a higher or lower level as required.

Equalization, or gain control, of analog signal paths shown in FIG. 3 occurs in a similar manner to that described for alert and volume levels. Thus, the A/D converter 46 receives as inputs, voltages that are output at respective terminals 73 and 78. It will be remembered that the terminal 73 outputs a control voltage for the current sink 35 and that the terminal 78 receives a dc voltage proportional to the voltage across the tip and ring conductors of the line 16. It is this latter voltage that is encoded by the converter 46, the output of which is applied to the register 94. In response thereto, the register 94 outputs to a three-bit automatic gain control bus 101 which is routed to automatic gain control circuits 102 and 103 (FIG. 3) that form part of the transmit and receive equalizers 36 and 37, respectively.

A corresponding six-bit control gate output from the register 94 is routed via a control gate bus 104 to the controllable gates 24, 38, 39, and 105-109, inclusive, which are shown diagrammatically in FIG. 3. Since the main purpose of this figure is to illustrate signal paths, control leads to these gates from the bus 104 are not shown. Reference to Table A shows the bit pattern array of bits M0-M5 and the respective gates that are operable thereby.

It has been described that when the interface 17 receives a valid message or when a key is depressed, it is only then that the interface 17 is switched from an idle mode to an active mode. As a consequence the interface 17 draws a constant current because it is only at that time that an output voltage at the terminal 73 is present to turn on the current sink 35. It will be understood, therefore, that the gain and gate control features apply exclusively to the interface 17 since a corresponding current sink is not used in the interface 11 and corresponding terminals 73' and 78' are grounded (FIG. 2a).

The interface 20 has utility at the set 18 as a high speed data port which may be used concurrently with the set 18 in view of the voice band and signalling band signals being frequency division multiplexed on the line 16. Thus, as a signalling channel, the port 14 of the interface 20 could be used for special services such as telemetry, alarm signalling and intercom switching.

Central to the operation of the interface 11 and 17 is the controller 25 which is a programmable logic array that functions to test incoming signalling data and to generate and output the PACK signal to signify receipt of a valid signalling message. To enable this function, a three-bit address bus 110 connects the address portion of a message input to the register 23 to the controller 25. Conversely, a data bus 111 output from the controller conducts the PACK signal to the register 23 from which it is output to the terminal 91 as a carrier signal modulated by a serial bit stream corresponding to the PACK signal.

The modulated carrier signal is received by the demodulator 29 which detects the serial bit stream and inputs same to the register 32 under control of clock pulses from the controller 25. A parallel bit message signal output from the register 32 is conducted via a data bus 112 to a data decoder 113 that drives the display 53.

A parallel five-bit data bus 114 routes an output of the decoder 113 to another input of the register 94, one output of which is serialized and connected to one input of a test register 115. An output 116 of the register 115 permits monitoring the following:

(a) The automatic gain control output as a function of the voltage at the terminal 78;
(b) The voice and alert volume controls as a function of "Volume Up" and "Volume Down" key depressions;
(c) The present state of the analog section control gates; and
(d) The presence of an echo mode.

Further testing of data processing circuits in an interface 17 is performed by a test register 117. It will be observed in FIG. 4 that outputs from the demodulator 29 and the register 23 comprise inputs to the register 117. Under Message data stored in the register 32 is clocked out therefrom in serial form along a bus 120 connected to the interface 20. Clock pulses from the interface 20 are applied to the register 32 along a lead 121.

Referring next to FIGS. 1 and 4, it will be seen that the interface 11 communicates with the scan circuit 21 via the port 14' and that a lead 125 carries a signal to indicate the presence of a data message for the interface. A lead 127' carries a 50% duty cycle 2.56 MHz clock signal from the clock 50' to the interface 11. The port 14' lead is unique to each interface 11 and carries receive and transmit data bidirectionally between the interface 20' and the facility 19 via the access circuit 13. A control signal from the facility 19 disables the codec 20 during data transactions between the facility 19 and the interface 11.

Figure 7:
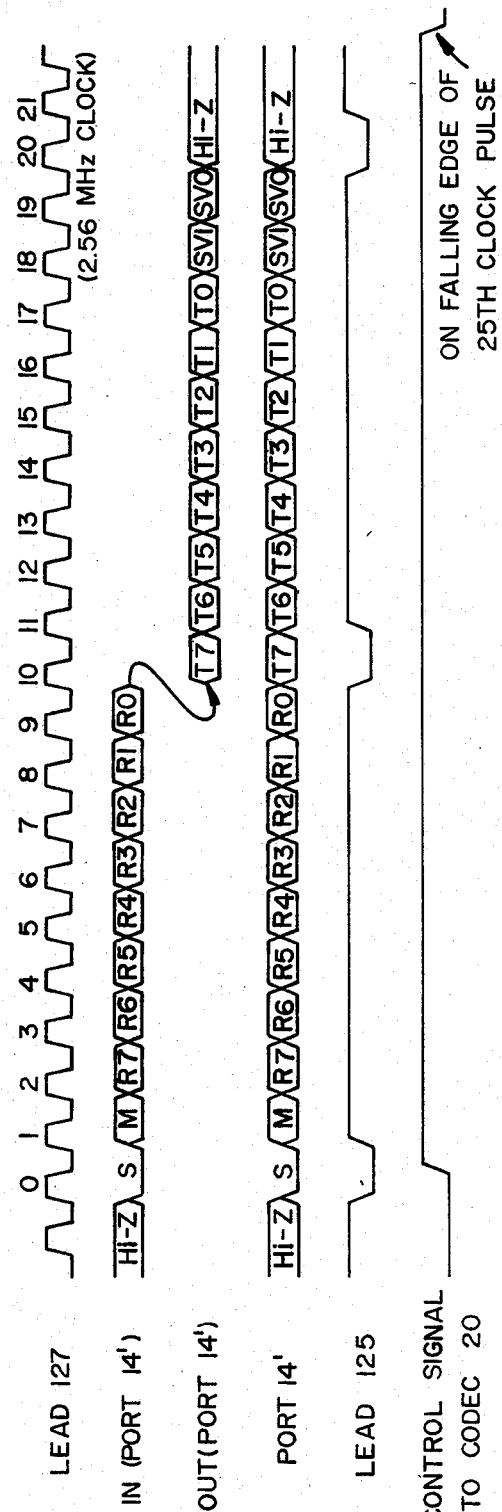
FIG. 7 is a timing diagram for a high speed data bus interface shown in FIG. 4.

Each data transaction consists of a 10-bit receive portion and a 10-bit transmit portion. The bit sequence of each portion is illustrated in FIG. 7 and valid transactions are shown in Table C. It will be understood therefrom that when an interface 11 is scanned by the facility 19 via a POLL transaction, the interface 11 responds with the SV1, and SV0 bits. Some time after SV0 goes high, the circuit 13 will request data using transactions OPEN-IN, IN, and CLOSE-IN, in that order. The times between scans will be about 4 ms so that a one deep buffer suffices for both receive and transmit portions of the high speed side. Similarly, some time after SV1 goes low, the circuit 13 will transmit data using the OPEN-OUT, OUT, and CLOSE-OUT transactions in order. Transactions will always be separated by at least one channel time. If more than one OUT transaction is received before CLOSE-OUT, a message nibble will overwrite the four bits transferred in the last OUT transaction. If one or two IN messages is received, the

TABLE C

| DIRECTION | | | RECEIVE | | | | | | | |
|---|---|---|---|---|---|---|---|---|---|---|
| PURPOSE | START | MODE | MSG CODE | | | | DATA | | | |
| DESIGNATION | S | M | R7 | R6 | R5 | R4 | R3 | R2 | R1 | R0 |
| | 0 | 1 | 0 | 0 | 0 | 1 | X | X | X | X |
| | 0 | 1 | 0 | 0 | 1 | 1 | X | A2 | A1 | A0 |
| | 0 | 1 | 0 | 1 | 0 | 1 | M7 | M6 | M5 | M4 |
| | 0 | 1 | 0 | 1 | 1 | 1 | M3 | M2 | M1 | M0 |
| | 0 | 1 | 0 | 0 | 1 | 0 | X | X | X | X |
| | 0 | 1 | 0 | 1 | 0 | 0 | X | X | X | X |
| | 0 | 1 | 0 | 1 | 1 | 0 | X | X | X | X |
| | 0 | 1 | 0 | 0 | 0 | 0 | X | X | X | X |
| | 0 | 1 | 1 | X | X | X | X | X | X | X |
| | 0 | 0 | X | X | X | X | X | X | X | X |

| DIRECTION | | | TRANSMIT | | | | | | | | |
|---|---|---|---|---|---|---|---|---|---|---|---|
| PURPOSE | START | MODE | | | | | DATA | | BF[1] | DR[2] | |
| DESIGNATION | S | M | T7 | T6 | T5 | T4 | T3 | T2 | T1 | T0 | SV1 SV0 |
| | 0 | 1 | X | X | X | X | X | X | X | X | (BF) (DR) POLL |
| | 0 | 1 | X | X | X | X | X | X | X | X | (BF) (DR) OPEN-OUT |
| | 0 | 1 | X | X | X | X | X | X | X | X | (BF) (DR) OUT |
| | 0 | 1 | X | X | X | X | X | X | X | X | (BF) (DR) CLOSE-OUT |
| | 0 | 1 | X | X | X | X | X | A2 | A1 | A0 | (BF) (DR) OPEN-IN |
| | 0 | 1 | X | X | X | X | M7 | M6 | M5 | M4 | (BF) (DR) IN |
| | 0 | 1 | X | X | X | X | M3 | M2 | M1 | M0 | (BF) (DR) CLOSE-IN |
| | 0 | 1 | X | X | X | X | X | X | X | X | (BF) (DR) ENTER LOOP AROUND MODE |
| | 0 | 1 | X | X | X | X | X | X | X | X | X X Msg Code out of Range |
| | 0 | 0 | X | X | X | X | X | X | X | X | X X Invalid Mode | control of a test controller 118, which receives test request instructions along a lead 119 from the interface 20, the controller 118 may selectively enable either register 116 or 117. In the case of the latter register, an output 117' thereof may be selected to monitor data as it is transmitted from the register 23 or received demodulated data that is input to the register 32.

interface 11 will respond with message nibble one.

As described hereinabove, individual interface 17 messages can be transferred using four data transactions. Three transactions are used to receive/transmit the set 18 address, message nibble one and message nibble two, and a fourth transaction polls the SV0, SV1 bits to initiate the exchanges. It will be noted, however, that the interface 11 high speed side will ignore transactions with either a message bit R7 set or a mode bit M low.

In the interface 17, the port 14 may be used for data input and output in a manner that is identical to its operation in the interface 11 with the following exceptions:

(a) The address bits A2, A1, A0 are ignored during the OPEN-OUT transaction, however the transaction must still take place.

(b) The address bits must be ignored during the OPEN-IN transaction, however the transaction must still take place.

(c) SV0 goes high when a line 129 output from the controller 25 goes low, and goes low 1 ms after the line 129 goes high.

(d) SV1 is also set high when the key pad initiates a message.

(e) The received data is output on a bus 128 while the line 129 is low as described hereinbelow. The port 14 read transactions (OPEN-IN, etc.) must occur within 2 ms of the line 129 going high to guarantee that a new message does not overwrite the receive register 32.

(f) All timing specifications for the port 14 and the lead 127 with respect to the clock 50 are the same except that the clock frequency for the interface 17 is 512 KHz instead of 2.5 MHz in the case of the interface 11.

(g) The "ENTER LOOP AROUND MODE" message serves to put the interface 17 into a test mode. There is no LOOP mode for the interface 17. Upon receiving this message, the interface 11 will loop the next OPEN-OUT, OUT and CLOSE-OUT transactions through the network 30 and then back into the system using the OPEN-IN, IN, and CLOSE-IN transactions. PACK transmission or detection is not required at the loop side for this message; otherwise the message will be processed normally. After the loop-around is complete, the interface 11 will exit loop-around mode and resume normal operation.

The foregoing reference made to the line 129 and the bus 128 relates to an external data bus shown in FIG. 4. Transaction code messages with correct address, parity and collision bits, as shown in Tables A and B, are shifted out serially on the bus 128. Shifting begins after parity is checked, i.e., 18 ms after initiation of a start bit. The line 129 provides a strobe for data. The line goes low for the full duration of the bus 128 out operation. The data is shifted out at an 8 KHz rate. To facilitate clocking of the data by external circuitry, a strobed 8 KHz clock (not shown) is output from the register 32 via a lead 130. Data output on the bus 128 is thus available to operate with peripherals; for example, an alphanumeric display.

Transmit and receive analog signalling paths in the interfaces 11 and 17 are illustrated in FIG. 3. Having regard to this figure, together with FIGS. 1 and 2, it will be seen that a receive audio path with equalization and gating control extends between the input terminal 62 and output terminals 135 and 136. Voice band signals, together with the modulated carrier, are separated at the input by means of the low pass filter 43. The voice band signals passing therethrough then follow one of two paths.

The first voice analog path includes the control circuit 103 and follows therefrom through a serial combination of the gate 39 and an amplifier 137 of the equalizer 37 to the output terminal 136.

Depending upon which interface is used will determine the connection from the output terminal. Thus, FIG. 2a shows that the terminal 136 is connected directly to a speaker amplifier 138 of a hands-free circuit 139. The output of the amplifier 138 drives a handsfree speaker 140 as illustrated.

A second voice analog signal path includes an amplifier 141, at the output of which the signal is summed with a sidetone voice signal from an amplifier 159, then through a gate 105, and an output amplifier 142 to the output terminal 135. Connections therefrom are determined by the mode in which the interface functions. For example, FIG. 2a shows that the terminal 135 connects directly to the receiver 42 of the set 18.

Shown also in FIG. 2a are the terminal connections from the interface 11 to the codec 20. Thus, the output terminal 136' is coupled via a capacitor 143 to the input of the codec 20. The output terminal 135' in the interface 11 is not used.

Another voice analog path from the output of the gain control circuit 103 leads through a gate 109 and the volume control circuit 95 through a driving amplifier 145 to an input of an amplifier 146 having its output connected to a terminal 147. FIG. 2a shows that this output is not used in the interface 11 and that in the interface 17 the output is used to drive the input of an amplifier 148 which in turn drives the speaker 100. An input terminal 149 constitutes a feedback point in the present circuit and is connected to a feedback circuit of the amplifier 146.

The modulated carrier signal appearing at the terminal 62 is conducted through a gate 24, followed by a high pass filter 31 and an amplifier 150 to the input of the demodulator 29. The demodulated output signal therefrom comprises digital message information and has been previously described in respect of FIG. 4. It will be understood, however, that the gate 24 is disabled when a one is sent out on the line 16 to prevent feedback between the output terminal 57 and the input terminal 62. When a zero is transmitted, the gate 24 is enabled to permit monitoring the line 16 for collisions as previously described.

When the interface 17 is in the LOCAL TONE RINGING state, the path from a local tone generator 151 to the speaker 100 via an amplifier 152 is enabled. Thus, a gate 107 is enabled by the "turn on TONE" message and disabled by the "turn off TONE" message. Encoded forms of these messages may be seen in Table A.

With the interface 17 in the BUZZ state, a path from a local buzz generator 153 is enabled. The signal level in this path is also controlled by the amplifier 152. The gate 106 is enabled by the "turn on BUZZ" message and disabled by the "turn off BUZZ" message. An amplifier 154 driven by the amplifier 152 is controllable by means of a hookswitch controlled circuit 155. The circuit 155 is enabled when the set 18 is OFF HOOK, and introduces a 10 dB attenuation into the TONE and BUZZ paths shown in FIG. 3.

The voice analog signal path to the volume control circuit 95 is completed by enabling the gate 109 when a "Turn on Tip/Ring to Speaker" message is received. The gate 109 is disabled by either the set 18 going OFF HOOK or on the reception of a "Turn off Tip/Ring to Speaker" message.

In a TONE RINGING mode, a gate 108 is enabled to route the ring tone from the gain control circuit 103 through the volume control circuit 96. TONE RING- ING mode is entered when a "Turn on RING" message is received and is left when a "Turn off RING" message is received.

The set 18 is in a HANDSET mode when the transmitter 40 and receiver 42 of the set are enabled by the gates 38, 39 and 105. These gates are enabled by a "Turn on Handset" message provided that the set 18 is also OFF HOOK. Should the set 18 be ON HOOK, the message is ignored and not stored in the controller 25. (FIG. 4). The gates 38, 39 and 105 are disabled when the set 18 HOOK, or when a "Turn off Handset" message is received.

In all states the speaker 100 is enabled, it will be disabled when the goes OFF HOOK. The speaker will not be re-enabled if the set 18 should subsequently go ON HOOK, but will be re-enabled only under message control.

The transmit path for voice analog signals is routed from an input terminal 156 to the output terminal 57. According to FIG. 2, in the interface 17 a break contact of the hookswitch 157 is connected to the input terminal 156 thereby connecting the transmitter 40 to the terminal 156 when the set 18 goes OFF HOOK. In the interface 11, however, an output from the codec 20 is coupled via a capacitor 158 to the input terminal 156' whereby decoded voice analog signals from the facility 19 are input to the interface 11.

In either event voice analog signals are applied, on the one hand, to an input of the sidetone amplifier 159 and therefrom through the gate 105, and the amplifier 142 to the terminal 135. In the case of the interface 11, this terminal is not used, but in the interface 17 the output from this terminal is connected to the receiver 42 to provide sidetone.

The analog signals are also input to the gain control circuit 102 of the equalizer 36 and therefrom through the low pass filter 41, the gate 38 and a buffer amplifier 160 to the output terminal 57.

Modulated carrier signals appearing at the terminal 91 are applied to the input of an amplifier 161 and are attenuated therein. The output of the amplifier 161 is input to the high pass filter 27 and therefrom through the amplifier 160 to the output terminal 57.

It will be apparent to those skilled in the art to which this specification is addressed that the embodiments heretofore described may be varied to meet particular specialized requirements without departing from the true spirit and scope of the invention disclosed. The foregoing embodiments are therefore not to be taken as indicative of the limits of the invention but rather as exemplary structures of the invention which is described by the calims appended hereto.

What is claimed is:

1. A signal multiplexing circuit selectively operable as a line card interface for a digital access circuit of a central data and voice conmunication facility and as a station set interface for a data and voice station, and which is controllably oprable for bidirectional communication between the line card interface and addressable ones of a plurality of station interface interconnected via a two wire telephone line, comprising:
    line sampling means responsive to a carrier signal for detecting an active line state in the presence of the carrier signal on the telephone line and an inactive line state in the absence thereof;
    transmit register means responsive to a data message bit field input thereto for storing the bits until the occurrence of a predetermined inactive line state;
    controller means operably responsive to data message bit fields input thereto and to the detected inactive line state for enabling a serial data bit output of the transmit register means;
    modulator means having an input coupled to the serial data bit output for modulating a high band carrier signal and outputting the modulated high band signal on the telephone line; and
    equalizer means having analog signal receiving and transmitting paths including respective automatic gain control circuits connected between the telephone line and corresponding signal inputs and outputs for controlling signal gains, and gate means for selectively enabling and disabling the receiving and transmitting paths in response to predetermined ones of the data message bit fields input to the controller means.

2. A circuit as claimed in claim 1 wherein the telephone line sampling means includes demodulator means having an input connectable to the telephone line for detecting the data message bit field carried by the modulated high band carrier signal.

3. A circuit as claimed in claim 2, wherein the telephone line sampling means further includes receive register means to which the detected bit field is coupled for storing the bits thereof.

4. A circuit as claimed in claim 3, further comprising:
    bus interface means having a data input connected to a first output of the receive register means, a bidirectional data port connectable to the digital access circuit and a data output connected to a first data input of the transmit register means.

5. A circuit as claimed in claim 4, further comprising:
    means for disabling a codec portion of the digital access circuit during bidirectional communication between the interfaces.

6. A circuit as claimed in claim 5, further comprising:
    encoder means having a data bus output connected to a second data input of the transmit register means and a plurality of inputs connectable to a switching matrix; and
    means for periodically scanning the crosspoints of the matrix for generating predetermined data message bit fields in response to crosspoint closures and outputting same on the data bus.

7. A circuit as claimed in claim 6, further comprising:
    decoder means having a data input connected to a second output of the receive register means and a corresponding output adapted to drive a visual display.

8. A circuit as claimed in claim 7, wherein respective ones of the analog signal receiving and transmitting paths include a low pass filter to reduce crosstalk between voice signals of the station and the modulated high band carrier signal.

9. A circuit as claimed in claim 8, wherein the input of the demodulator means is connected to the telephone line via a first high pass filter and the carrier signal output of the modulator mean is connected to the telephone line via a second high pass filter.

10. A circuit as claimed in claim 9, wherein the analog signal receiving and transmitting paths include line coupling means intermediate the signal multiplexing circuit and the telephone line for isolating the circuit from the telephone line and converting analog voltage signals output from the multiplexing circuit to a predetermined line driving current.

11. A circuit as claimed an claim 10, wherein the coupling means comprises:
- a signal coupling transformer having first and second isolated windings, the former being connectable to the telephone line and the latter being connected directly to the analog signal receiving path;
- a first line driver amplifier having an input connected to the analog signal transmitting path and an output connected to the second winding;
- means for detecting a station set operating voltage on the telephone line; and
- means responsive to the detected operating voltage for establishing a source of constant operating current for the signal multiplexing circuit.

12. A circuit as claimed in claim 11, further comprising visual display means operably connected to the visual display data output for visually indicating the status thereof.

13. A circuit as claimed in claim 10, wherein the coupling means comprises:
- a hybrid transformer having first and second isolated windings, the former being connectable to the telephone line and having a split center-tap for connection across a battery that functions as a telephone line voltage source, and the latter having a center-tap with a first half of the center-tapped winding being connected directly to the analog signal receiving path, and the second half of the center-tapped winding being connected to the output of a second line driver amplifier having an input connected to the analog signal transmitting path, and a third isolated winding serially connected with a balance current circuit across a source of operating current that conducts a balancing current through the third winding to reduce dc flux in the core of the hybrid transformer.

14. A circuit as claimed in claim 12 further comprising an electronic telephone station set that includes:
- a transmitter connected to the input of the analog signal transmitting path;
- a receiver connected to the output of the analog signal receiving path;
- a key pad having a switching matrix with three dedicated crosspoints for establishing a three bit binary address that uniquely identifies individual ones of a plurality of station sets connected to the telephone line, the switching matrix being connected to the plurality of inputs of the encoder means; and wherein,
- the visual display means comprises a liquid crystal display of the telephone station set.

15. A circuit as claimed in claim 14 wherein the transmitting path of the equalizer means further comprises:
- a transmit gain control circuit having an input connected to the telephone station set transmitter, a control input connected to the controller means and responsive to a first control signal therefrom for controlling the signal gain of the transmitting path, and an output connected to an input of the low pass filter;
- a buffer amplifier having an output connected to the input of the first line driver amplifier; and
- a transmit control gate connected between an output of the low pass filter and an input of the buffer amplifier to establish a controllable signal connection therebetween in response to gate enabling and disabling control signals from the controller means.

16. A circuit as claimed in claim 15 wherein the receiving path of the equalizer means further comprises:
- a receive gain control circuit having an input connected to the second isolated winding of the signal coupling transformer via the low pass filter of the receiving path and a control input connected to the controller means and responsive to the first control signal for controlling the signal gain of the receiving path;
- an output amplifier having an output connected to the receiver; and
- a receive control gate connected between an output of the receive gain control circuit and an input of the output amplifier to establish a controllable signal connection therebetween in response to gate enabling and disabling control signals from the controller means.

* * * * *